Dec. 4, 1923.

G. W. PICKARD ET AL 1,476,102

OPTICAL SELECTION OF SPLIT MICA SHEETS

Filed Aug. 23, 1921     5 Sheets-Sheet 1

INVENTORS
Greenleaf Whittier Pickard
and Julian Barth
BY
Philip Farnsworth  ATTORNEY Dec. 4, 1923.
1,476,102
G. W. PICKARD ET AL
OPTICAL SELECTION OF SPLIT MICA SHEETS
Filed Aug. 23, 1921
5 Sheets-Sheet 3

Fig.5.

Inventor
Greenleaf Whittier Pickard
and Julian Barth
By their Attorney

Dec. 4, 1923.

G. W. PICKARD ET AL

1,476,102

OPTICAL SELECTION OF SPLIT MICA SHEETS

Filed Aug. 23, 1921    5 Sheets-Sheet 5

INVENTOR
Greenleaf Whittier Pickard
and Julian Barth
BY
Philip Farnsworth ATTORNEY Patented Dec. 4, 1923.

1,476,102

UNITED STATES PATENT OFFICE.

GREENLEAF WHITTIER PICKARD, OF NEWTON CENTER, MASSACHUSETTS, AND JULIAN BARTH, OF NEW YORK, N. Y., ASSIGNORS TO WIRELESS SPECIALTY APPARATUS COMPANY, OF BOSTON, MASSACHUSETTS, A CORPORATION OF NEW YORK.

OPTICAL SELECTION OF SPLIT MICA SHEETS.

Application filed August 23, 1921. Serial No. 494,602.

*To all whom it may concern:*

Be it known that we, GREENLEAF WHITTIER PICKARD and JULIAN BARTH, citizens of the United States, residing respectively at Newton Center, Massachusetts, and New York city, New York, have invented certain Optical Selection of Split Mica Sheets, the principles of which are set forth in the following specification and accompanying drawings, which disclose the form of the invention which we now consider to be the best of the various forms in which the principles of the invention may be embodied.

This invention relates to the selection of certain mica sheets or "films" from those which have been split to thicknesses of the order of one-half mil to twenty or more mils from commercial mica and then cut to areas of the order of a fraction of a square inch to the largest sheets used commercially, and to the shape desired for use in the arts, as for manufacturing electrical condensers, especially of the high-potential type, or phonograph reproducing diaphragms. The films selected for use in manufacturing are those shown by the employment of the invention and the execution of the method to be suitable for the desired use, the others being discarded, at least for such use. The selection involves principally considerations of the thickness of each film and its uniformity of thickness thruout its area, a common desideratum being a collection of films all of which shall have the same thickness within limits of slight tolerated departures which may vary for different jobs. In practice the invention is being employed principally in the selection of mica films as a step in the process of manufacturing high-tension electrical mica condensers; and it is useful also in all cases where mica films of definite thicknesses are desirable or even necessary, as in any structure composed of stacks of mica films such, for example, as phonograph reproducers, electrical insulators, etc., etc., where the advantages of uniformity and thickness may be either electrical or mechanical or both. In manufacturing condensers, this invention is employed preferably as the first step in handling the cut mica films, since the process makes evident many faults such as cracks, cross crystallization of the mica, thin and thick spots, holes, etc., which only other tests such as careful eye inspection and electrical tests will show. In fact, so thoro is the weeding out by this invention that such other tests may be dispensed with.

The object of this invention is to reduce the labor cost of film-selection, and to increase accuracy of selection of a stack of films of uniform thickness, each of which shall have uniform thickness and structure thruout its area; such increase of accuracy involving a better article made of such sheets, obviating the labor cost of rebuilding an article shown by test to be inferior on account of inaccurately selected mica films, and a reduction in the cost of the films themselves. The last is so because films are selected to a minimum thickness with a tolerance on the positive side; and since the new method permits greater accuracy, the tolerance can be held closer, making the average thickness less. Thus two mil minimum and one-half mil plus tolerance averages two and one-quarter mils, whereas two mil minimum and one mil plus tolerance averages two and one-half mils, a saving of ten per cent per sheet or twenty per cent. per condenser of given capacity. A saving of labor cost is also effected by putting less burden of accuracy of splitting on the splitting operative.

The invention consists of the apparatus substantially as shown in the drawings, and in the methods of selection by the operative which are involved in her use of such apparatus.

Heretofore the thickness-selection of mica films for use in electrical condensers and the like has been effected by mechanical micrometering by women operatives. That method had the following three principal disadvantages. First, it did not result in the selection of films all of which had substantially the same thickness, because it depended upon micrometer-manipulation which could not be uniformly accurate if reasonably high speed of operation were maintained. Secondly, it did not result in the selection of films each of which had uniform thickness thruout its area, because the labor-cost involved a speed of operation which precluded micrometering of more than a limited number (usually one) of the portions of the area of a film. Thirdly, the total labor cost accompanying the old method was high, not only from the speed of operation limited by the use of the mechanical micrometer, but by the liability to a bad product of condenser or condenser section which required reoperation on account of the inclusion of perhaps only a single film of unsuitable thickness. This invention makes possible a good product at low cost, obviating remaking the product.

The method hereof has been termed "optical micrometering" and the apparatus an "optical micrometer" because they involve the measurement of thickness of mica films with micrometer accuracy by the optical method hereof; but these terms are not adequate because one of the greatest utilities of the invention is the selection of films each of which has uniform thickness and structure thruout its area. The method will be understood best from a description of the apparatus, as follows.

Figure 4:
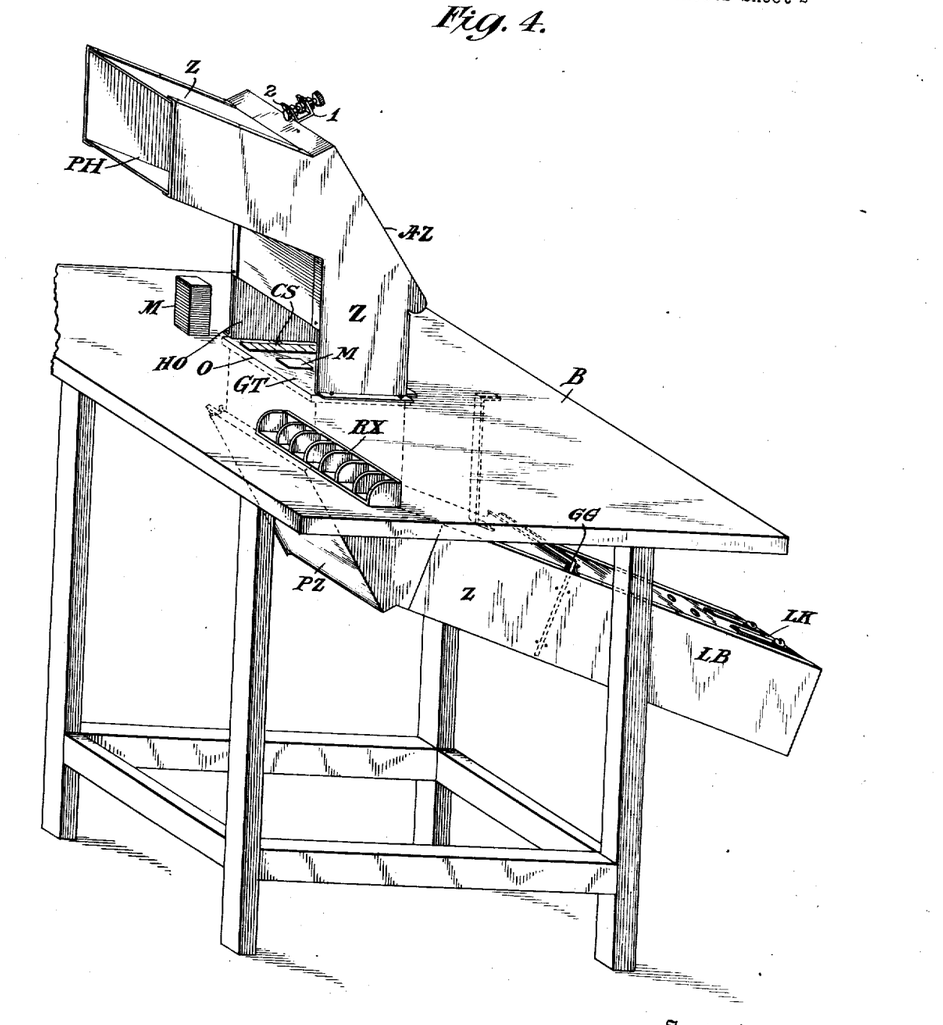
Fig. 4 is a perspective view of the preferred form of apparatus.

Referring to Fig. 4 (and Figs. 5-6), the apparatus comprises a generally Z-shaped "dark-box" or light-chute Z (black-painted inside) the intermediate portion of which is vertical and mounted in the top of a suitable table or work-bench B before which the operative sits (left, Fig. 4). She manipulates the film to be observed on a glass table GT in front of her mounted over a hole O cut thru bench B (Fig. 5), and observes at a higher level thru the peephole PH at the upper end of dark-chute Z. The principle involved is that the color of a mica film (or a portion thereof) when observed under certain optical conditions to be described, is a definite criterion of its thickness. With the use of the apparatus shown, the color indications from mica film M thru peephole PH are very brilliant and sharply defined for variations in thickness of about one-half mil, and shading gradually but unmistakably from one sharply-defined color to the next for the slight but important variations of thickness of the order of a tenth of a thousandth of an inch. These colors include the entire range of the spectrum and may involve mixed as well as pure spectral colors. The colors depend somewhat on the color of the original source of light. With "daylight mazda" lamps, the following colors are associated with the corresponding thicknesses:—

| Mils. | Color. |
|---|---|
| 1. | Straw-yellow. |
| 1.5 | Brown-yellow. |
| 2. | Brown-red. |
| 2.25 | Purple. |
| 2.5 | Dark blue. |
| 3. | Blue. |
| 3.5 | Green-blue. |
| 4.0 | Green. |
| 4.5 | Yellow-green. |
| 5. | Yellow. |

Glass table GT is inset on table or bench top B over hole O therein (Fig. 5), in the path of the light rays upwardly traversing the dark-chute Z. The light enters chute Z from its lower end, and passes angularly and upwardly to a combined light-polarizer and reflector PZ, thence thru hole O in bench B, glass table GT and the mica film M placed thereon for observation, thence thru the upper part of dark-chute Z above bench B to a combined light-analyzer and reflector AZ, and thence angularly to the operative's eyes thru peephole PH. Glass table GT (and mica films on it) lies in a plane transverse to the rays of light passing from polarizer PZ to analyzer AZ.

Figure 5:
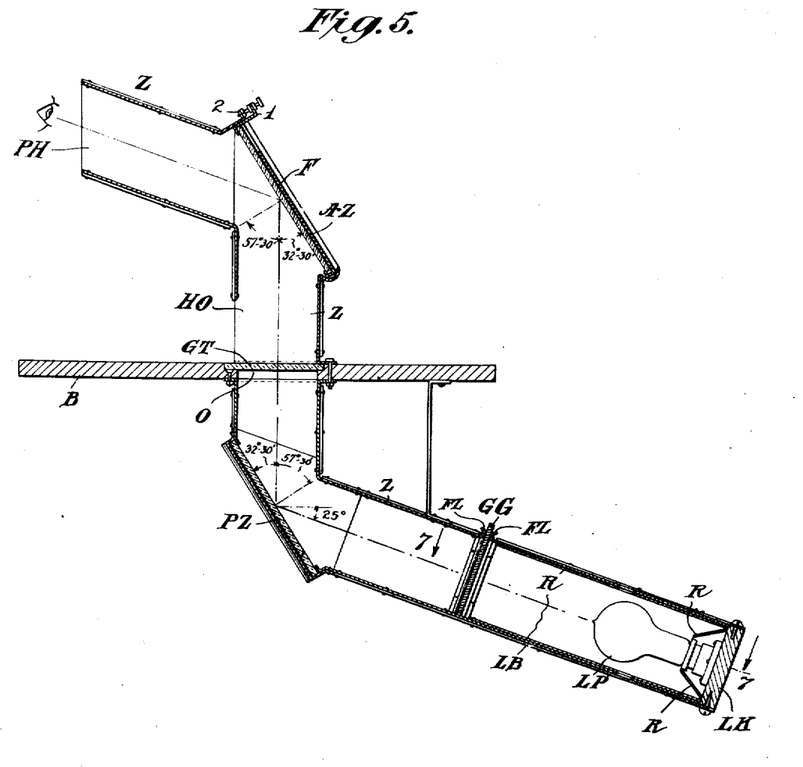
Fig. 5 being a vertical section taken fore and aft of the apparatus, and Fig. 6 being a front elevation.
Figure 7:
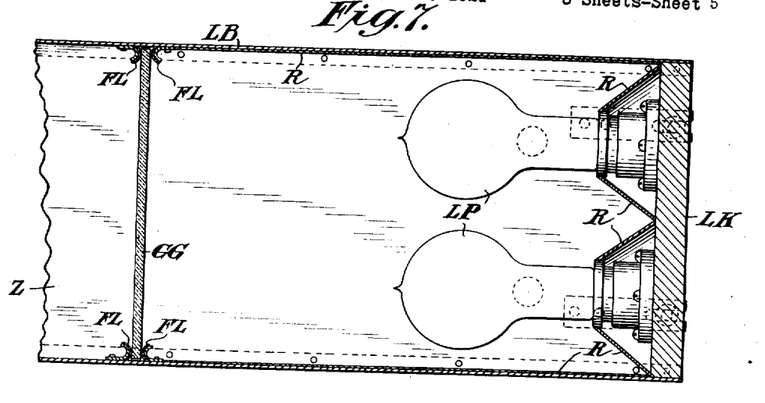
Fig. 7 is an enlarged horizontal section (7—7 of Fig. 5) of the light-box (and of its lamp-carrier), which in Figs. 4-6 is shown connected with the lower end of the main light-chute of the apparatus.

A light-box LB, rectangular in cross-section, is connected as a continuation of the lower inclined part of dark-chute Z (which is supported by the illustrated bracket from bench B); and a lamp-carrier LK is mounted in the end of this light-box LB, as shown in Fig. 7 (and Figs. 4 and 5). At the upper end of light-box LB which adjoins the lower end of dark-chute Z is mounted a plate of ground glass GG which therefore is located between the artificial source of light on lamp-carrier LK, and polarizer PZ (Fig. 4). The length of light-box LB, i. e., the distance between the artificial source of light and ground glass GG, is somewhat critical (in order to cause suitable diffused light to fall on polarizer PZ), for the ultimate purpose of causing uniformity of light rays thru the mica sheet M under observation on glass table GT. The construction and arrangement of light-box LB, lamp-carrier LK and ground glass GG are such as to cause suitable diffusion of light, the criterion of which is a substantial lack of spots of greater illumination on ground glass GG corresponding in number to the number of artificial sources (preferably two incandescent lamps LP) in lamp-carrier LK. In Fig. 7, lamp-carrier LK consists of any suitable support for the ordinary lamp-sockets as shown for lamps LP mounted as shown, this support being provided above and below with a pair of projecting screw heads which enter slots in four corresponding metal spring strips mounted on the lower end of light-box LB. In Fig. 7 lamp-carrier LK is shown thus held in place in the end of light-box LB so that lamps LP are located inside said box. The end inside surface of lamp-carrier LK (constituting the lower end of light-box LB, Fig. 5) is covered (Fig. 7) with nickel-plated metallic reflecting surfaces R, with openings as shown to permit the screwing of lamps LP in their sockets shown in Fig. 7. Also all four side-walls of light-box LB are lined with like nickel-plated reflectors R. Ground glass or light-diffuser GG is mounted in the upper end (Fig. 5) of light-box LB, so as to be located between lamps LP and polarizer PZ. Unless the distance between lamps LP and light-diffuser GG is sufficient, they will make two spots of light on said diffuser. (As shown, Fig. 4, GG is located directly transverse of the light-box LB and dark-chute Z, i. e., at right angles to the rays from the source of light.) This distance should be such that the ratios of the distances from lamps LP to different parts of diffuser GG to one another are substantially equal to unity; and then in connection with reflectors R there will be uniform illumination of polarizer PZ by diffuser GG so that the illumination of the polarizer will be the substantial equivalent of that by sunlight or of that from a greater number of sources than the two lamps LP shown. (In the apparatus in use, each lamp is a one hundred watt lamp of the type known as "daylight mazda".) With these lamps LP, there will be not only direct illumination of diffuser GG from the lamps, but also by reflection from all the four sides and the lower inside end of light-box LB, so that with the proper distance between lamps LP and glass GG, there will be substantially no spots of light on the diffusing glass. The reflectors R contribute to evenness of illumination on glass GG, but the distance between lamps LP and glass GG is also very important in preventing unevenness or "spottiness" of illumination. We have found that this distance between lamps LP and glass GG under the conditions above described, is of the order of approximately twice that of the greatest dimension of the glass GG (which is four by eight inches in area); or that the distance desirable is as great as is physically convenient without too-great reduction of intensity of light from the artificial sources LP.

The above arrangement of light-box LB, reflector R and lamp-carrier LK is entirely practicable for use with an artificial light-source, but of course may be replaced by equivalents involving such aids as complex lenses between the artificial source and ground glass GG; for example, such as condensing lenses with or without reflectors back of the artificial light-source; or, if suitable lenses alone without ground glass GG be sufficient to diffuse the light upon polarizer PZ, then glass GG may be dispensed with as an aid to diffusion, especially if such lens arrangement produces substantially equivalent illumination of polarizer PZ. In the arrangement shown, however, there is total internal reflection in light-box LB on ground glass GG. While each lamp LP alone affects glass GG only thru a small solid angle, yet the reflector back of the lamps returns to diffusing-glass GG the light which otherwise would be lost rearwardly, and the side reflectors return to diffusing-glass GG the light that otherwise would stray off to the sides. This arrangement provides complete diffusion from an artificial light-source, in addition to the described adequate intensity. The importance of the proper light-box LB as above is indicated by the bad effect on the appearance thru peephole PH of mica film M under observation (Fig. 4) on glass table GT, in case the light is not adequately diffused to polarizer PZ. In such case the parts of the surface of mica film M would be in parts of the light field of different intensities, the mica colors in the dark part of the field being darker than the mica colors in a lighter part of the field, so that the film would not appear of uniform color thruout its area even altho it were of uniform thickness. Such conditions also would destroy the utility of comparison scale CS (Figs. 2 and 4, to be described), in case the sample mica films on said scale were in parts of the light field of different intensity from the part of the field occupied by film M under observation.

Figures 8, 9:
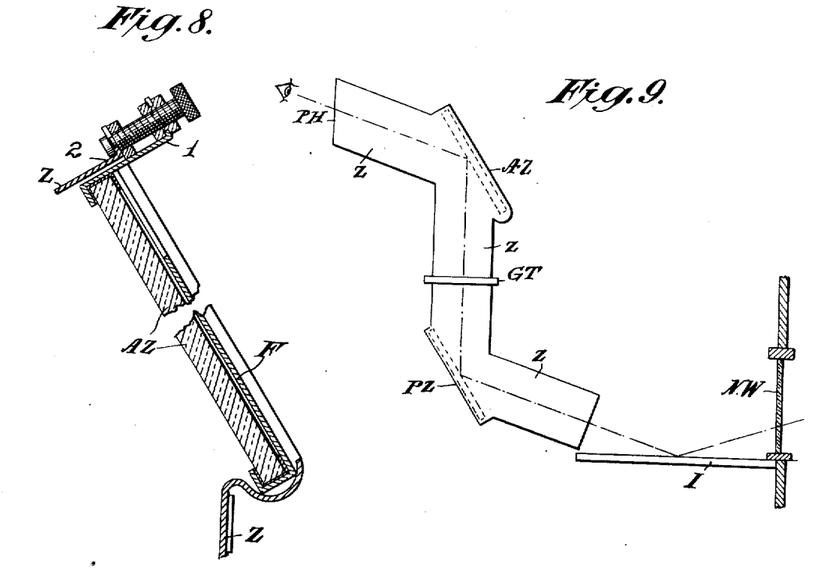
Fig. 8 is a detail view showing the combined analyzer and reflector AZ and its mounting.
Fig. 9 (modification) is a side elevation of parts of the apparatus of Figs. 4-6 adapted for the use of sunlight instead of light from an artificial source as from the lamps in the lamp-carrier of Figs. 4-7.

In the modification of Fig. 9 where daylight is used instead of an artificial source as in Figs. 4–7, the diffusion of light on polarizer PZ is satisfactory without any light-box LB or diffusing-glass GG; for daylight comes from the sky over a large solid angle, and therefore gives satisfactory diffusion, as distinguished from artificial light from a point source.

Light-box LB hereof with its reflectors R serves in effect to multiply the sources of artificial light and thereby to increase the intensity at GG. This box is constructed of one thirty-second inch sheet brass, nickel-plated, and has four sides, so that each of the two light-sources LP is reflected and re-reflected many times (from the four reflecting surfaces R), so that in effect there are multitudinous light-sources. In general, lamps LP themselves are located to cause diffusion of light at GG, being located as far as possible from GG without materially reducing the light intensity thereat. The increase of effective intensity, obtained by reflectors R, permits sufficient distance from GG to the lamps to obviate the disadvantageous light-spotting on GG.

The dark-chute Z is of one-sixteenth inch sheet iron riveted together; but instead of having interior reflectors, all its interior surfaces, from ground glass GG to top peephole PH are lacquered to have a dead-black finish. Dark-box Z and light-box LB are secured together as shown (Figs. 4 and 5) with ground glass GG at their juncture. Pieces of felt FL are interposed as shown at the edges of the two surfaces of glass GG to protect the same from fracturing contact with the ends of the metallic box LB and chute Z.

Polarizer PZ is located a moderate distance (see dimensions below), as shown, Fig. 5, from glass GG to receive light coming therethru. Polarizer PZ is located as shown at the lower end of the vertical portion of dark-chute Z. At the top of this vertical portion is located the light-analyzer AZ. The polarizer and analyzer are here so called from what they do to the light incident upon them. In the practical example shown, PZ and AZ each comprises a mirror (Fig. 8) consisting of a sheet of quarter-inch plate glass, dead-black-lacquered on its back, i. e., their unpainted surfaces facing one another inside dark-chute Z (Fig. 5). Optical equivalents of PZ and AZ may be used, of course, as polarizer and analyzer respectively, such as Nicoll prisms, etc., etc. PZ and AZ are located parallel to one another. Each of PZ and AZ has an angle with the vertical of 32° 30' (thirty-two degrees and thirty minutes), i. e., the difference between 90° and the polarizing and analyzing angle of 57° 30'. The said "vertical" is the vertical position of dark-chute Z. The polarizing and analyzing angles respectively are the angle between said "vertical" and a line perpendicular (normal) to the mirror. This normal line is midway between the incident and reflected light rays.

The area PZ and AZ and consequently the cross-sectional dimensions of dark-chute Z and lamp-carrier LK are made relative to the areas of the mica films to be tested (usually no magnification is needed), which usually run from one inch or less on a side to films as large as three inches by four inches, and in exceptional cases even larger. Thus, the areas of PZ and AZ, considering their proper functioning angles, are made such that the cross-sectional dimensions of dark-chute Z and lamp-carrier LK will be sufficient to permit the part of glass table GT which lies within chute Z to be large enough to accommodate the largest size of mica films to be tested, and also to accommodate the comparison scale CS alongside the film M being tested and within the light-path, this scale being involved in the preferred apparatus and method. (The drawings hereof were made from an apparatus in use, and are in general to actual proportion, the bench B being of ordinary work-bench height, and peephole PH being at the level of an average operative's eyes as she sits on a stool or chair in front of the apparatus.)

The actual dimensions of the apparatus in use are as follows. Polarizer and reflector PZ is seven and three-quarters inches high and nine and one-quarter inches wide. Analyzer and reflector AZ is eight and three-quarters inches high by eight inches wide. The centers of these two mirrors lie on the central line of the vertical portion of dark-chute Z, the inside dimensions of which are:—width (Fig. 6) eight inches, and fore-and-aft thickness (Fig. 5) four inches. The upper and lower angularly disposed ends of chute Z have the same interior dimensions. (Light-box LB also has the same interior dimensions as a continuation of dark-chute Z.) Light-box LB and the lower angularly disposed end of dark-chute Z are at an angle of 65° (sixty-five degrees), Fig. 5, with the vertical (i. e., 180°, less 115° which is double the polarizing angle). In other words, the light-box is at an angle of 25° (twenty-five degrees) with the horizontal (as the level surface of bench B). The upper angularly disposed end of dark-box Z (extending toward the operative's eyes) is of the same angle with the vertical as the lower end, i. e., 65°; or 25° with the horizontal. (For the upper end, the angle is that above the horizontal, as distinguished from the lower end which is the angle below the horizontal. See Fig. 5.) If comparison-scale CS be not employed, the left-to-right width of chute Z (Fig. 6) may be less and it might be square; in which case the dimensions of PZ and AZ would be modified accordingly.

Figure 6:
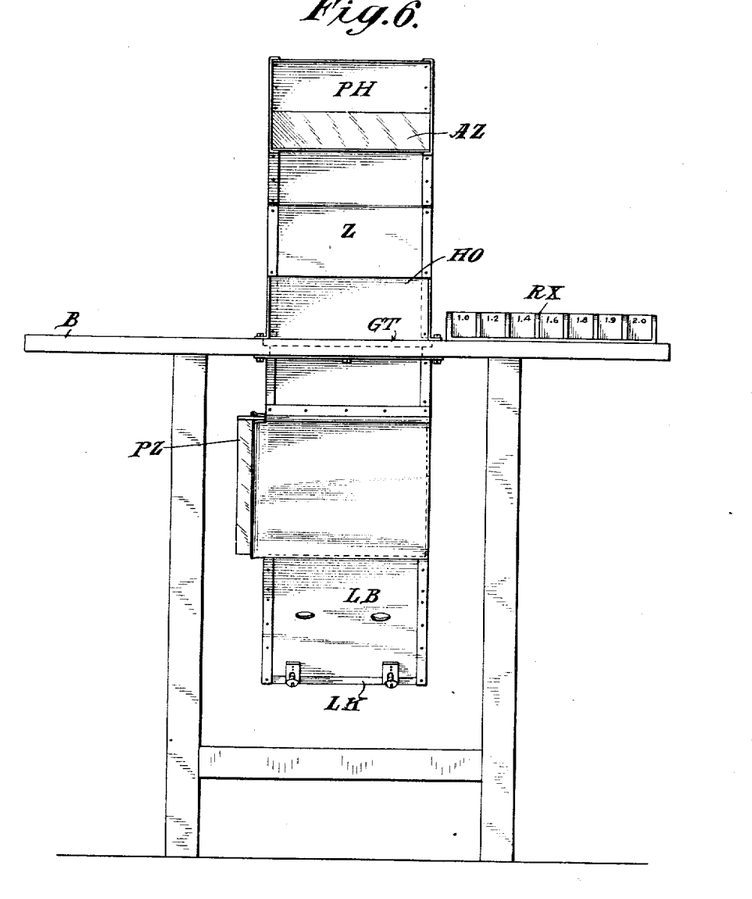

As shown in Fig. 6, polarizer PZ is mounted in dark-chute Z in such way that it may be slid out of place (to the left) from the apparatus for the purpose of cleaning its interior surface.

As shown in Fig. 8, analyzer AZ is mounted in a metal frame F with bent-over edges, the analyzer being slid in place in frame F. The lower part of this frame F is received in a depression in light-chute Z (Fig. 5) which acts as a pivot mounting for it. The upper part of frame F is provided with a slotted strip 1 which is adapted to a similarly slotted strip 2 mounted on dark-chute Z, so that frame F may be held to said chute by suitable adjustable screw means. Thus analyzer AZ is readily assembled and accessible for cleaning its interior surface, and is adjustable for angle.

As shown in Fig. 4, glass table GT advantageously may project more or less forwardly of the hand opening HO into dark-chute Z for the convenience of the operator in placing a mica film M with her left hand on the table after having removed it from a collection of previously split and cut films M which may be placed on the bench or table B at the left of chute Z. The forwardly projecting part of glass table GT then serves as a way on which film M may be pushed by the right hand to a position on the rear part of the glass table within the field of the light rays passing up thru the glass table from polarizer PZ to analyzer AZ. As film M is pushed by the right hand into this field, the operator is observing thru top peephole PH, and at the same time is reaching with the left hand for the next film to be tested.

The apparatus in its simplest form may consist only of two elements, polarizer PZ and analyzer AZ in a suitable light-chute, located parallel to one another, the mica film being held between them in a plane across the light-path. The relative turning movement (infra) between the apparatus and the film may be obtained either by turning the polarizer and analyzer (both or either) or by turning the mica film; but the preferred apparatus is that shown where the apparatus is fixed and the film is turned.

In that the above apparatus employs artificial light, it is preferred over the daylight apparatus of Fig. 9. But that of Fig. 9 may be employed when conditions of location are suitable, as when a north window is available, as will be described. In the case of either apparatus, the colored image of the mica sheet may be projected upon a screen, but that usually is not necessary on account of the great facility and certainty of operation by the apparatus and method disclosed.

While magnification or screen projection may be involved in an apparatus or method under the invention, yet in practice they are not usually necessary or desirable. They are not usually necessary because the image seen thru the peephole PH is ample to permit satisfactory selection or discarding films of the area usually employed. They are not usually desirable (as a matter of the apparatus employed), because the whole area of the comparatively large mica film is usually desired to be within the field of vision in cases where, as usual in condenser manufacture, for example, the uniformity of thickness thruout a film is an important desideratum. The form of apparatus shown is that which is most appropriate for the intended factory use, where the entire outfit may be incorporated with an ordinary workbench before which the operator sits in an ordinary stool or chair.

In Fig. 9 the dark-chute Z is the same as before, as are also polarizer PZ, analyzer AZ and glass table GT. Here, however, the lower inclined end of chute Z receives the light rays of naturally-diffused daylight entering as from a north window NW, as conveniently via mirror I mounted in a horizontal position by means of any suitable support and having a silvered back. In this case, silvered mirror I replaces lamp-carrier LK of the preceding figures, and no light-box LB or ground-glass light-diffuser GG is needed, on account of the intensity and diffusion of the daylight employed. As before, the operator observes (thru top peephole PH) the image in analyzer AZ of a mica film which has been laid on glass table GT within chute Z, alongside, preferably, of a comparison scale CS to be described.

The general design of the preferred apparatus is such that only such light rays from the source of uniform illumination, ground glass GG, reach the eye at PH, as retain, substantially, their parallelism while undergoing the various optical changes. It is accomplished by having as small a cross-sectional area of light-chute as will accommodate the largest film to be inspected, and by having as great a distance as is conveniently possible between the ground glass GG and polarizer PZ, between polarizer PZ and analyzer AZ, and between analyzer AZ and the eye at PH.

The optical phenomena involved demand that for most intense colors, the analyzer AZ be fixed in relation to the polarizer PZ so that when nothing intervenes between polarizer PZ and analyzer AZ, there is either a maximum or a minimum transmission (or reflection) of polarized light by the analyzer AZ. The position of the analyzer AZ in the preferred apparatus is that of maximum reflection, i. e., in the arrangement shown. If that part of the apparatus above the table B were swung thru a horizontal angle of 90°, we would have a case of minimum reflection. The two different arrangements give, for graded thicknesses of mica, two different sets of colors which are substantially complementary sets of colors. In a position of analyzer AZ halfway between the above-stated positions of maximum and minimum reflection respectively, colorlessness of mica results when a film is inspected between analyzer and polarizer, and such colorlessness grades into one set or the other of colors as the analyzer is turned respectively towards the stated positions of maximum or minimum reflection. In the preferred apparatus, the maximum reflection position is used because the set of colors corresponding to a range of films between one and four mils in thickness is a more sharply defined and more easily recognizable set of colors than the complementary set which would be observed at the position of minimum reflection.

Figure 1:
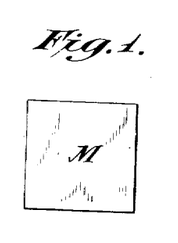
Figure 1 is a plan of a mica sheet or film M to be selected or discarded according to the operator's observation of its thickness in the apparatus pursuant to the method hereinafter described.
Figures 2, 3:
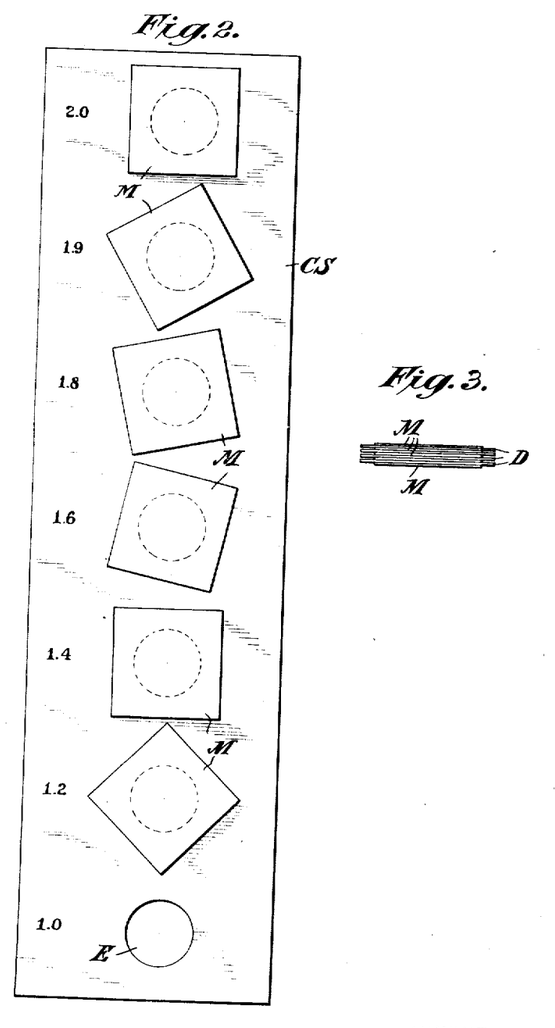
Fig. 2 is a plan of the operator's comparison scale involved in the apparatus and method.
Fig. 3 is an elevation of a stack of a high-tension electrical condenser in which are used the mica films selected according to the invention, and indicating the uniformity of thickness of the mica films (the thickness shown for clearness being much greater than that usually employed)

The preferred method of selection, using any suitable form of apparatus of the invention, involves the use of comparison scale CS or its equivalent, shown separately in Fig. 2 and in assembly in Fig. 4 on glass table GT in the line of the light rays passing up thru chute Z from polarizer PZ to analyzer AZ. This scale consists (Fig. 2) of a support or mounting strip CS which may be of cardboard and has light-holes E therein to receive light from glass table GT (Fig. 4) on its way upward to analyzer AZ. One or more (preferably several) mica films M (Fig. 1) of known thickness-condition are gummed to this cardboard strip over holes E so that light rays will pass thru the films on their way up thru bench-opening O (Fig. 4) and glass GT to analyzer AZ. Such a comparison-scale may be made up and installed for each different job, as for example, for the manufacture of a given electrical condenser which requires mica films having no more nor less than a given limited range of thicknesses. In the comparison scale shown (Fig. 2), this thickness-tolerance is between one mil and two mils as indicated by the mil-marking for the operator's guidance on the strip CS. The following is the manner of making and installing a comparison scale CS for a given job. First, the strip CS with light-holes E is placed and fixed (as by gluing) to the desired portion of glass table GT, as at the left as shown in Fig. 4, and oriented rectilinearly with the glass table. Then a mica film M known to be of uniform thickness thruout its area and known to be of a thickness corresponding with the notation on the left of a given hole E in strip CS (Fig. 2), is placed over the hole E opposite such notation. (In Fig. 2, all but one of the mica films are shown in place over the holes, and one hole is left uncovered at the bottom opposite the notation "1.0", meaning one mil.) Assume that the film in question is of known one-mil uniform thickness, and has been placed temporarily but not secured over hole E opposite the note "1.0". The initial angular position flat on glass table GT in which such film may be placed temporarily may or may not be the position which will result in showing color to the installer's eye as he looks in the top peephole PH; or if color does happen to show in such initial angular position, that position of the film may or may not be the position which will bring out the color most intensely. In either case, the installer then turns the film (flat on CS) in order to determine whether the intensity of the color may be increased. If the turning results in a decrease of intensity, then the film is turned back to the position resulting in greatest intensity. In any case, the film is gummed to strip CS at the angular position flat on it at which it shows the greatest intensity when viewed thru peephole PH. The turning of the film may be a maximum of 45° (forty-five degrees), although it usually is less; but the turning is done in all cases even if only slightly, because the color-appearance is most intense only when the mica film, flat on glass table GT, occupies a definite angular position in its plane transverse to the light rays passing thru dark-chute Z. This is due to the fact that the relative position of the axis of crystallization to the polarized rays determines the change in the polarized rays.

With the complete installation of comparison scale CS as above by the installer, the apparatus is ready for the execution of the method by the operative which involves a comparison of the appearance of a given film M (Fig. 4) of unknown thickness to be measured, with the sample films of known thickness-conditions on scale CS, by inspection thru peephole PH.

The colors (at maximum intensity) of different films vary widely within very narrow limits of film-thickness, so that great accuracy of selection may be obtained, i. e., as great as within fractions of thousandths of an inch, i. e., of the order of ten-thousandths of an inch.

First, the operative, with the fingers of her left hand, picks up a film from the mass of previously split and cut films M to be measured which lies on bench B at the left of chute Z (Fig. 4). She places this film on the forwardly-projecting portion of glass table GT, removes her left hand (which goes back to the left for the next film) and with the fore- and middle fingers of the right hand she pushes the film (to be inspected) into position on glass table GT alongside of scale CS. Then with the same two right-hand fingers (while the left hand is picking up a second film from the left and while she is looking thru peephole PH) she turns the first film until she observes thru peephole PH the most intense color from this first film, precisely as the installer did in placing the sample films on the comparison scale. She then instantly compares this color (yet looking thru peephole PH) with those of the sample films on scale CS, observes whether it matches the color of one of the films on the scale, i. e., whether it is within the tolerance limits of the scale (or, if desired, observes the notation of thickness alongside the sample film which most nearly approximates the apparent color of the film under test), and thereupon with the same right-hand fingers she pulls the tested film from table GT and drops it into a "good" or "bad" box, as the case may be (or places it in a compartment of a grading-box RX for tested films located on bench B at the right of chute Z, which compartment is milmarked to correspond with the matched sample of scale CS). Discard is made not only of too-thick or too-thin films, but also of each film which shows a difference of colors at different parts of its area, for that means lack of uniform thickness of such film. These non-uniform films, which may be wholly undesirable for use in condensers, preferably are dropped into a different receptacle from those films which are rejected for being too thick or too thin, as the latter may be useful in other condenser-jobs.

In Fig. 3 is shown a portion of a condenser stack consisting of alternate elements of selected mica films M and dielectric or insulating sheets D as of tinfoil. It is such mica films which it is of the greatest importance to have not only of like thickness one to another, but each one of uniform thickness thruout its area in order to act equally at all points with respect to the electrical stresses involved in the operation of the condenser.

This method of test shows up minute mica cross-crystals (if they exist) embedded in or between the laminæ of the film (the films are not usually split to a single laminæ but only to a thickness of one or more mils); and such a condition of course is a source of electrical weakness such that if such film were incorporated in a condenser, it might cause breakdown of the stack. This method also shows up holes, which are of course zero thickness of mica. All such films, of course, may be dropped into the box of absolute discards, as in the case of those of non-uniform thickness thruout their area.

This method does not show up vertical cracks in the films (which do not involve any variation in thickness of film) if the crack is clean, i. e., has no frayed edges, to any better advantage than direct visual inspection; but this is not a practical limitation because cracks usually have frayed edges which means non-uniform thickness. The method very beautifully shows up such dangerous variations in thickness of a given film as those which frequently are caused by the initial splitting or cutting of the sheets, i. e., the breaking away of one or more of the laminæ for a part of the area of the film, usually adjoining its edge, this being the case of the most frequent and most serious departure from the desired uniformity of thickness thruout the film-area, and being unobservable by any other practicable method so far as we know.

Inasmuch as the last-named defects usually occur at the edges of the films, the cross-sectional area of light-chute Z is made greater than the total area of the film to be observed, in order to permit inspection thru peephole PH of its area at its edges.

From the above, it appears that the method consists in obtaining mica films each of substantially uniform thickness thruout its area and all of substantially the same thickness within the tolerance limits for a given job for use in condensers and other mica articles, by selecting such films as are shown, by turning the film into its critical position under the optical conditions employed, to be of said thickness, and in grouping the films which successfully pass the test. Such grouping may be either by placing the "good" films in the compartments of a grading-box RX (Fig. 4), graded in accordance with comparison scale CS, or by grouping all the good films in one box for use in a given job which involves the tolerance limits corresponding to the comparison scale CS. Also such grouping may be of the films outside of the tolerance limits of a given job, but "good" as to uniformity of thickness thruout area, for other jobs; or of the too-thick films for further splitting and subsequent retesting hereby.

While the scale CS mounted within the field of light in chute Z is preferred, yet a comparison scale may be used which has the given colors painted upon it and which may be mounted within the range of vision of the operator, as on the outside of chute Z above hand opening H, i. e., out of the field of light in chute Z. But such a painted scale so located manifestly lacks the advantages of the illustrated scale CS.

It may be possible for an operative to become so skilled as to make unnecessary the use of any scale, placing reliance solely on color-memory; but this is not preferred on account of the obvious liability to error and the vital importance of preventing such error, for even a single too-thin film if embodied in a condenser stack might result in a breakdown of a completed condenser which might require very large labor cost in rebuilding the stack.

In the use of the mica-measuring apparatus hereof, there is a phenomenon which may be termed "color-octaves"; that is, for example, a very thin film may indicate a color somewhat similar to that of a very thick film, but the similar colors of different octaves are so different in quality or richness that mistakes cannot be made. In addition, they lie so far apart in thickness of mica that the touch sense of stiffness easily distinguishes them.

The invention is based on the facts long known to physicists that mica and other films would show colors under certain optical conditions of polarized light and that such colors have a direct relation to the thickness of the film under observation; therefore we make no claim to such discovery. Our invention is directed to mica films which previously have been split to comparatively slight thicknesses suitable for use in the arts, and which also preferably have been cut (as by suitable die ng machinery) into shapes suitable for particular uses in the arts as in electrical condensers (the dimensions of the apparatus hereof being adapted in a given case to the area of the split and preferably cut films); and the apparatus and method are concerned in the selection of films of desirable thickness and each of uniform thickness thruout its area from quantities of such previously split (and preferably cut) films, and in the rejection of films which lie outside (too thin or too thick) of the thicknesses to be tolerated for a given condenser or other job, and (in condenser work) in the rejection also of each film of non-uniform thickness thruout its area; and all this involves the determination of the thickness of the films and the uniformity of thickness of each of them from the apparent colors thereof when observed under the optical conditions described.

Ordinary skilled splitting is so accurate that most of the films which come to the apparatus of this invention are within the usual tolerance limits for the average condenser, and the relatively few which are far outside (having accidentally got by the splitting operation) are readily discarded by the sense of feeling; so that, aside from the discarding of films which are just out of range of thickness, the principal utility of the invention (involving the cost reductions above stated) is in the discard of films which are non-uniform thruout their area.

We claim:—

1. In the art of manufacturing articles comprising split mica films, the apparatus for selecting films having a condition as to thickness which is suitable for such articles, from a quantity of such films having unknown thickness-conditions, which comprises a light-chute having dark interior walls and a cross-sectional area larger than the area of the films to be handled, said chute having a central portion mounted to be generally vertical and having upper and lower inclined end portions, the whole being generally Z-shaped, and the end of the upper inclined portion being open to transmit light to the eyes of an observer; a light-box mounted with and constituting an extension of the lower inclined chute-portion and having reflecting interior surfaces; a lamp-carrier adapted to receive a lamp near the end of the light-box remote from the end of the lower inclined chute-portion; a light-polarizer constructed and mounted to receive light from said light-box and transmit it upwardly thru the central portion of the light-chute; a light-diffuser mounted between the lamp and polarizer and sufficiently remote from the lamp to prevent substantial light spots on said diffuser; a light-analyzer constructed and mounted to receive light from the polarizer and transmit it thru the upper inclined chute-portion to the observer's eyes; said light-chute having an opening in the side of its central portion between the polarizer and analyzer and facing in the same direction as the upper inclined chute-portion; and a transparent film-support mounted in and transverse of said light-chute below said opening.

2. Apparatus for selecting mica films of desired thickness-condition, which comprises a light-chute having a central portion and two end portions inclined thereto, the whole being generally Z-shaped and having dark interior surfaces; one end of the chute being open to transmit light to the eyes of an observer; a light-box mounted with and constituting an extension of the other inclined end of the light-chute, said light-box having reflecting interior surfaces; a source of artificial light mounted to supply light to said light-box; a light-polarizer constructed and mounted to receive light from the light-box and transmit it thru the central portion of the light-chute; a light-analyzer constructed and mounted parallel to said polarizer to receive light therefrom and transmit it to the observer's eyes through said open end of the chute; the angles of the inclined end portions of the light-chute conforming generally with the angles of the incident and reflected rays of the parallel polarizer and analyzer; said light-chute being provided with a hand-opening between the polarizer and analyzer and permitting manual turning of the mica films inside the light-chute during observation through the open inclined end portion of the Z-shaped chute; and a light-diffuser mounted in the path of light between the light source and the polarizer.

3. Apparatus for selecting mica films of desired thickness-condition, which comprises a work-table or bench and a substantially Z-shaped light-chute combined therewith; the central portion of said chute being supported generally vertically upon and extending thru, above and below the top of the said work-table; the upper inclined end of said chute being directed forwardly from the work-table and open to the eyes of an observer; the lower inclined end of said chute being directed in the opposite direction and open to a source of light; a transparent mica-film-support mounted on the table transversely of the light-chute, the latter being provided with a hand-opening above said support facing forwardly; a light-polarizer constructed and mounted to receive the entering light and transmit it upwardly thru the vertical central portion of the chute, the transparent support and the mica films thereon; and a light-analyzer constructed and mounted to receive the light from said polaraizer and support, and transmit it thru the upper inclined portion of the light-chute to the eyes of the observer.

4. Apparatus for selecting mica films of desired thickness-condition, which comprises a light-chute having a central portion and two end-portions inclined thereto, the whole being generally Z-shaped; one end of the chute being open to receive light from a suitable source, and the other end being open to transmit light to the eyes of an observer; a light-polarizer constructed and mounted to receive the entering light and transmit it thru the central portion of the chute; a light analyzer constructed and mounted parallel to said polarizer to receive the light therefrom and transmit it thru the observer's chute-end; the angles of the inclined end portions of the light-chute conforming generally with the angles of the incident and reflected rays of the parallel polarizer and analyzer; and a transparent mica-film-support mounted in a plane transverse to the light-rays passing from the polarizer to the analyzer; the central portion of the chute being provided with an opening in one side above said support and constructed to permit manual turning of the mica films inside the light-chute during observation through the open inclined end portion of the Z-shaped chute.

5. Apparatus for selecting mica films of desired thickness-conditions, from a quantity of such films having unknown thickness-conditions, which comprises a light-chute having a cross-sectional area greater than the area of the films to be handled and having a central portion supported generally vertically, and two inclined end portions, the whole being generally Z-shaped; a light-polarizer constructed and mounted to receive light thru the lower inclined end of the chute and to transmit it up thru the vertical portion of the chute; and a light-analyzer constructed and mounted parallel to said polarizer to receive light therefrom and transmit it to the eyes of an observer thru the upper inclined portion of the light-chute, the end of which is provided with an opening which permits passage of such light; the central generally vertical portion of the light-chute being provided with a hand-opening located between the polarizer and analyzer and constructed to permit manual turning of the mica films inside the light-chute during observation through the open inclined end portion of the Z-shaped chute.

6. In the art of manufacturing apparatus comprising split mica films, the apparatus for selecting films having a condition as to thickness which is suitable for such articles, from a quantity of such films having unknown conditions as to thickness, which comprises a light-chute having a cross-sectional area greater than the films to be selected; a light-polarizer constructed and mounted to receive light rays and transmit them thru said chute; a light-analyzer constructed and mounted parallel to said polarizer to receive said rays and transmit them to the eyes of an observer, one chute-end being provided with an opening to permit light and the other end being open to permit observation; said chute being provided with a hand-opening between the polarizer and analyzer and constructed to permit manual turning of the mica films inside the light-chute during observation of rays from the analyzer; a transparent support mounted between the polarizer and analyzer in a location accessible through said hand-opening; and a mica film of known-thickness condition mounted on said support for comparison with a mica film under observation on said support.

7. In the art of manufacturing articles comprising split mica films, the apparatus for selecting films having a condition as to thickness which is suitable for such films from a quantity of such articles having unknown conditions as to thickness, which comprises a light-chute having a cross-sectional area which is larger than the area of each film to be observed; a light-polarizer constructed and mounted to receive light rays and transmit them thru the chute; and a light-analyzer constructed and mounted parallel to said polarizer to receive said rays and transmit them to the eyes of an observer; said light-chute being provided with a hand-opening between the polarizer and analyzer and constructed to permit manual turning of the mica films inside the light-chute during observation of the rays from the analyzer.

8. In the art of manufacturing articles comprising split mica films, the apparatus for selecting films having thickness-conditions suitable for such articles, from a quantity of such films having unknown thickness-conditions, which comprises a light-chute; a light-polarizer constructed and mounted to receive light and transmit it thru the chute; a light-analyzer constructed and mounted parallel to said polarizer to receive the light thru the chute from said polarizer and transmit it to the eyes of an observer; said light-chute being provided with a hand-opening between the polarizer and analyzer constructed to permit manual turning of the mica films inside the light-chute during observation of the rays from the analyzer.

9. In the art of manufacturing articles comprising split mica films, the method of selecting films having a condition as to thickness which is suitable for such articles from a quantity of such split films having unknown conditions as to thickness, which consists in placing the latter films in a plane transverse to light rays passing from a polarizer to an analyzer, alongside a comparison film of known thickness-condition, both films being oriented in their planes so that they appear to be highly colored to the eye of an observer receiving light from the analyzer which has passed thru said films; then comparing the color of the film under test with that of the comparison film; and selecting for the article of manufacture those of the films under test which are shown by said comparison to be of the desired thickness-condition.

10. In the art of manufacturing articles comprising split mica films, the method of selecting films having a condition as to thickness which is suitable for such articles, from a quantity of such split films having unknown conditions as to thickness, which consists in placing the latter films in a plane transverse to light rays passing from a polarizer to an analyzer; causing relative rotation of the optical system and each of such films until the latter is in such angular position in such plane that it appears to have the most intense coloring to the eye receiving rays from the analyzer which have passed thru the films, comparing such color with a color known to correspond with that of a mica film of given condition of thickness; and selecting for the article of manufacture those of the films observed which are shown by said comparison to be of the desired condition of thickness.

11. In the art of manufacturing articles comprising split mica films, the method of selecting films having a condition as to thickness which is suitable for such articles, from a quantity of such split films having unknown conditions as to thickness, which consists in placing the latter films in a plane transverse to light rays passing from a polarizer to an analyzer; turning said films in such plane until they assume such angular position as to appear to have the most intense coloring to the eye of an observer which is receiving the rays from the analyzer which have passed thru the films; and selecting for the article of manufacture those of the films observed which are shown by such apparent coloring to be of the desired thickness condition.

12. In the art of manufacturing articles comprising split mica films, the method of selecting films having a condition as to thickness which is suitable for such articles, from a quantity of such split films having unknown conditions as to thickness, which consists in placing the latter films in a plane transverse to light rays passing from a polarizer to an analyzer; causing relative rotation of the optical system and each of such films until the latter is in such angular position in such plane that the films appear to be of the most intense coloring to the eye of an observer which is receiving the rays from the analyzer which have passed thru the films; and selecting for the article of manufacture those of the films observed which are shown by their apparent coloring to be of the desired condition of thickness.

13. In the art of manufacturing articles comprising split mica films, the method of selecting films having suitable uniformity of thickness thruout their area from a quantity of such split films, which consists in placing the latter films in a plane transverse to light rays passing from a polarizer to an analyzer; causing relative rotation of the optical system and each of such films until the latter is in such angular position in said plane that they appear to be of the most intense coloring to the eye of an observer receiving light from the analyzer which has passed thru said films; and selecting for the article of manufacture those of the films observed which show the uniformity of color thruout their area which corresponds with the desired uniformity of thickness.

14. In the art of manufacturing electrical condensers comprising split and cut mica films, the method of selecting films having a suitable uniformity of thickness thruout their area, from a quantity of such split and cut films, which consists in placing the latter films in a plane transverse to light rays passing from a polarizer thru the entire film-area to an analyzer; turning said films in said plane until they appear to have the most intense coloring to the eye of an observer which is receiving the rays from the analyzer which have passed thru said films; and selecting for the condenser those of the films observed which show the uniformity of color thruout their area which corresponds with the desired uniformity of thickness.

15. In the art of manufacturing articles comprising split mica films, the method of selecting films having a condition as to thickness which is suitable for such articles, from a quantity of such films having unknown conditions as to thickness, which consists in causing light rays to pass from a light-polarizer thru the faces of such films to a light-analyzer while visually observing the light rays from the analyzer and simultaneously causing relative turning of the films and the optical system.

In testimony whereof we have signed our names to this specification.

GREENLEAF WHITTIER PICKARD.
JULIAN BARTH.

Certificate of Correction.

It is hereby certified that in Letters Patent No. 1,476,102, granted December 4, 1923, upon the application of Greenleaf Whittier Pickard, of Newton Center, Massachusetts, and Julian Barth, of New York, N. Y., for an improvement in "Optical Selection of Split Mica Sheets," errors appear in the printed specification requiring correction as follows: Page 9, line 110, claim 7, for the word "films" read *articles*, and line 111, for the word "articles" read *films;* and that the said Letters Patent should be read with these corrections therein that the same may conform to the record of the case in the Patent Office.

Signed and sealed this 5th day of February, A. D., 1924.

[SEAL.]
WM. A. KINNAN,
*Acting Commissioner of Patents.*